United States Patent

Marlow

[15] 3,688,607
[45] Sept. 5, 1972

[54] TRANSMISSION AND CONTROL
[72] Inventor: Jerry R. Marlow, Greenwood, Ind.
[73] Assignee: General Motors Corporation, Detroit, Mich.
[22] Filed: May 26, 1971
[21] Appl. No.: 147,072

[52] U.S. Cl....................74/866, 192/3.58, 91/411 R
[51] Int. Cl. ............................................G05g 13/04
[58] Field of Search ...............74/866, 869; 192/3.58; 91/411 R

[56] References Cited

UNITED STATES PATENTS

| 3,448,640 | 6/1969 | Nelson | 74/866 |
| 3,505,907 | 4/1970 | Fox et al. | 74/753 |
| 3,621,735 | 11/1971 | Lemieux | 74/866 X |

Primary Examiner—Edgar W. Geoghegan
Attorney—W. E. Finken, A. M. Heiter and D. F. Scherer

[57] ABSTRACT

A control for a multi-ratio transmission including a plurality of shift valves each having a differential area portion responsive to engagement pressure to control the engagement of a clutch or brake and a control chamber responsive to a variable control pressure. The pressure in the control chamber is established by a variable force solenoid to cause the shift valve to upshift or downshift and to provide a bias pressure for the regulating function of the shift valve. The control also includes relay valves situated between the pressure source and the shift valves to prevent excessive overlap of the drive establishing devices in the transmission.

3 Claims, 3 Drawing Figures

TRANSMISSION AND CONTROL

This invention relates to transmission controls and more particularly to transmission controls having solenoid valves to control the establishment pressure of a clutch or brake.

It is an object of this invention to provide in an improved transmission control shift valves having a differential area responsive to engagement pressure and a control chamber having a variable pressure for controlling the engagement pressure at said differential area.

Another object of this invention is to provide in an improved transmission control a shift valve having a control chamber subjected to a variable pressure in response to a variable force solenoid and a differential area subjected to engagement pressure in opposition to said variable pressure to regulate the engagement pressure on the clutches and brakes in the transmission.

These and other objects and advantages will be more apparent from the following description and drawings in which:

FIG. 3 is a diagrammatic view of an electronic control for controlling the system shown in FIG. 1.

Figure 1:
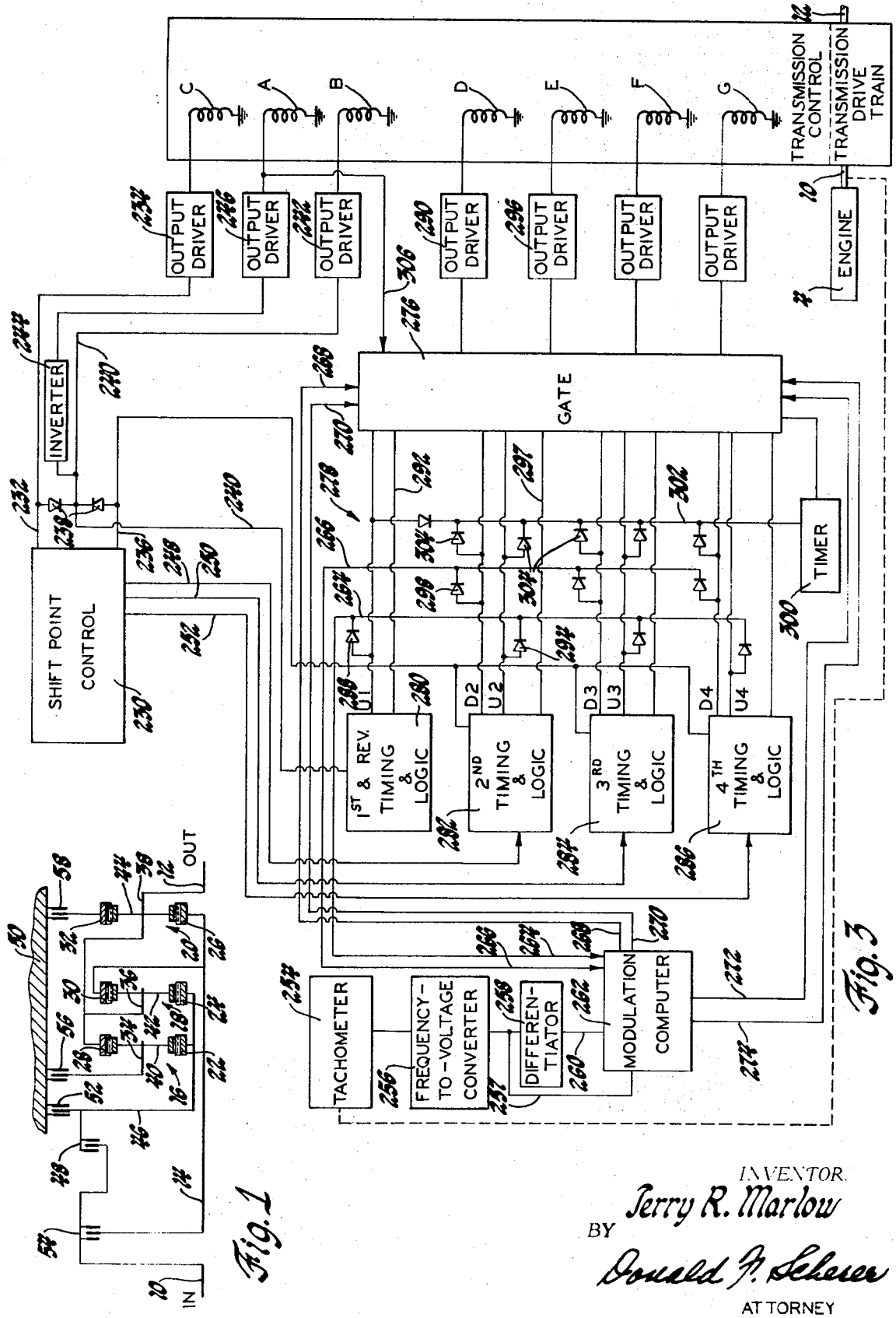
FIG. 1 is a schematic drawing of a planetary gearing arrangement.
Figure 2:
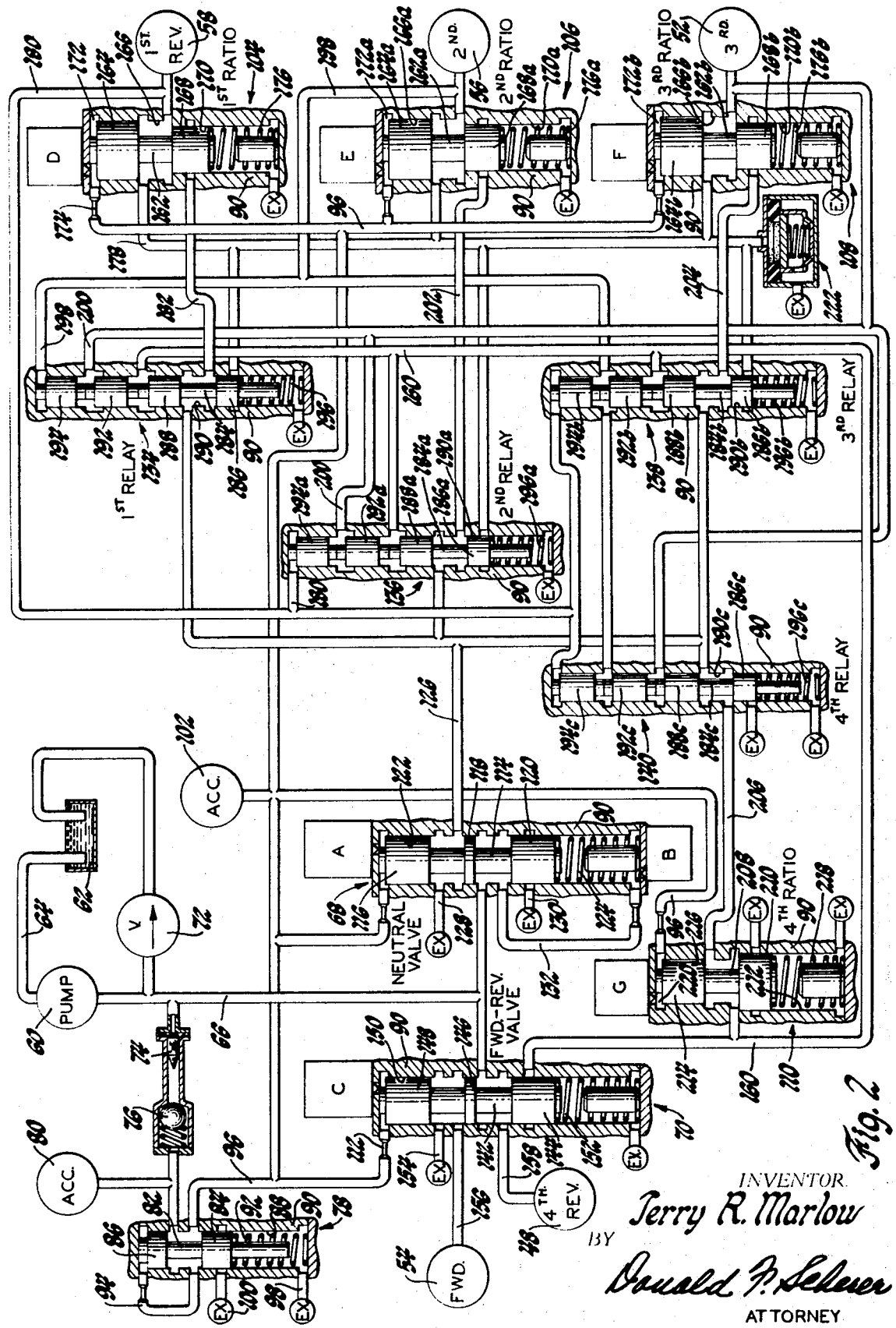
FIG. 2 is a diagrammatic view of a control system for controlling the gear ratios of the gearing shown in FIG. 1.

Referring to the drawing there is shown in FIG. 1 a gearing schematic having an input shaft 10, an output shaft 12, an intermediate shaft 14 and three planetary gear sets generally designated 16, 18 and 20. Each of the planetary gear sets 16, 18 and 20 have sun gears 22, 24 and 26 respectively, ring gears 28, 30 and 32 respectively, carriers 34, 36 and 38 respectively and planet gears 40, 42 and 44 meshing with their respective sun and ring gears. The sun gears 22 and 24 are selectively connectable through hub 46 with the input shaft 10 through a clutch 48 and with the transmission housing 50 through a brake 52. The ring gear 30 and sun gear 26 are drivingly connected to the intermediate shaft 14 which is selectively connectable to the input shaft 10 through a clutch 54. The carrier 34 and ring gear 32 are selectively connectable with the transmission housing through friction brakes 56 and 58 respectively. The ring gear 28, carrier 36 and carrier 38 are drivingly connected with the output shaft 12. Through selective engagement of various combinations of the clutches and brakes, four forward speeds and one reverse speed may be obtained between the input shaft 10 and the output shaft 12. The clutch 54 is engaged for all forward drives and the brakes 58, 56 and 52 and clutch 48 are selectively engaged for drive ratios 1 through 4 in the forward direction. For reverse drive the clutch 48 and the brake 58 are engaged. A more complete description of the operation of this gearing arrangement may be found in the patent application of O'Malley U.S. application Ser. No. 805,190, filed Mar. 7, 1969. The clutches and brakes of this transmission are conventional disc type friction torque transmitting devices having a hydraulically operated fluid motor which may be selectively actuated to provide for engagement and disengagement. A hydraulic control system for controlling the clutches and brakes is shown in FIG. 2.

The hydraulic control system includes an engine driven pump 60 which draws fluid from a reservoir 62 through an intake passage 64 and delivers fluid to a main pressure passage 66 which is connected to a neutral valve 68 and a forward reverse valve 70. The pressure in main passage 66 is controlled by a conventional pressure regulator valve 72. The main passage 66 is also connected through a filter 74 and a ball check valve 76 to a pressure reducing valve 78. An accumulator 80 is connected between the ball check valve 76 and the pressure reducing valve 78 to maintain a pressure charge on the pressure reducing valve 78 in the event that the pressure in main pressure passage 66 should fluctuate below the setting of the regulator valve 72, such as during the engagement of the clutches and brakes.

The pressure reducing valve 78 includes a valve spool 82 having equal diameter spaced lands 84 and 86 slidably disposed in a valve bore 88 which is located in a valve body 90. A compression spring 92 is compressed between valve land 84 and one end of bore 88 thereby placing a spring bias force on the valve spool 82. In the spring set position, main pressure from passage 66 is delivered between lands 84 and 86 to a pressure bias passage 94 which directs fluid pressure to the end of valve spool 82. Pressure on the end of valve spool 82 moves the valve spool against spring 92 so that when a predetermined pressure is present in passage 94 the land 86 will close off the main pressure from passage 66. This pressure is designed to be less than main pressure and is distributed from the area between lands 84 and 86 to a solenoid pressure passage 96. The valve 78 has two exhaust passages 98 and 100 which prevent fluid pressure build up in the area of spring 92 and relieve excessive pressure between lands 84 and 86 respectively. The passage 96 is connected with an accummulator 102, the forward reverse valve 70, the neutral valve 68, a first ratio shift valve 104, a second ratio shift valve 106, a third ratio shift valve 108, and a fourth ratio shift valve 110. This pressure passage supplies fluid to solenoid chambers on each of the valves to which it is connected and has a plurality of restrictions such as restriction 112 at valve 70 to prevent excessive fluid flow through the solenoid chamber of the valves when the solenoid valves are open.

The neutral valve 68 has a valve spool 114 having three equal diameter spaced lands 116, 118 and 120 slidably disposed in a valve bore 122 in the valve body 90. A compression spring 124 is compressed between one end of the valve bore 122 and valve land 120 to urge the valve spool 114 upward in valve bore 122 to the neutral position. The upper end of valve bore 122 is connected to a solenoid valve A and the lower end of the valve bore 122 is connected to a solenoid valve B. These solenoid valves A and B open in response to electrical signals and are closed by springs to permit the ends of the valve spool 114 to be selectively pressurized or exhausted. The bore 122 is connected with the main passage 66, solenoid pressure passage 96 and engagement passage 126, a pair of exhaust passages 128, 130 and a neutral passage 132. In the neutral position the passage 66 is connected between lands 118 and 120 with the neutral passage 132 which directs fluid to the lower end of valve spool 114 to assist the spring 124 in holding the valve spool 114 in the neutral position. In the neutral position the exhaust passage 130 is closed by valve land 120 while the exhaust passage 128 is opened between lands 116 and 118 with engagement passage 126. In the automatic position, that is when the solenoid valve B is open and solenoid valve A is closed, the spring chamber is exhausted through solenoid valve B while the upper end of valve spool 114 is pressurized, due to the closing of solenoid valve A, by fluid pressure in passage 96 so that the pressure on the end of valve land 116 urges the valve spool 114 downward against the spring 124 thereby connecting passage 66 with passage 126 to supply main pressure to the passage 126. The passage 126 is connected to first, second, third and fourth relay valves 134, 136, 138 and 140 respectively.

The forward-reverse valve 70 includes a valve spool 142 having three equal diameter spaced lands 144, 146 and 148 slidably disposed in a valve bore 150 in the body 90, a compression spring 152 is compressed between one end of valve bore 150 and valve land 144 and a solenoid valve C which controls fluid pressure in the valve bore 150 is positioned adjacent the end of valve land 148. The valve bore 150 is connected with the main passage 66, the solenoid passage 96, an exhaust passage 154, a forward clutch passage 156 and a reverse clutch passage 158. In the forward position solenoid valve C is closed so that fluid pressure from passage 96 acts on the end of valve land 148 to urge the valve spool 142 downward against spring 152 to provide fluid communication between main passage 66 and forward passage 156 to permit engagement of forward clutch 54. Also in this position, the reverse clutch passage 158 is in fluid communication between lands 144 and 146 with a fourth ratio engagement passage 160. In the reverse position the solenoid valve C is opened thereby exhausting the upper end of valve bore 150 to permit the spring 152 to move the valve spool 142 upward thereby connecting the forward clutch 54 to exhaust passage 154 between lands 146 and 148 and to connect main passage 66 to the direct reverse clutch 48 between lands 144 and 146. Also in the reverse position the passage 160 is blocked by valve land 144.

The first ratio shift valve 104 includes a valve spool 162 having a large diameter land 164 slidably disposed in valve bore 166 and a small diameter land 168 slidably disposed in valve bore 170, a solenoid valve D controls fluid pressure in valve bore 166 adjacent the upper end of valve land 164. The valve land 164 and the valve bore 166 cooperate to form a control chamber 172 which is supplied with fluid pressure through a restriction 174 from the solenoid passage 96. The valve spool 162 is urged upward by a compression spring 176. The valve bore 166 is in fluid communication with an exhaust passage 178 and a first ratio engage passage 180 which is connected to the first ratio brake 58 and to the second, third and fourth relay valve 136, 138 and 140 respectively. The valve bore 170 is in fluid communication with a first ratio feed passage 182 which is connected with the first relay valve 134. A solenoid valve D is a variable force solenoid valve such as that shown in U.S. Pat. No. 3,225,619 issued to R. H. Shaeffer, Dec. 28, 1965. The variable force solenoid functions such that as the current applied to the solenoid valve increases the output force of the solenoid valve increases so that the solenoid valve progressively moves toward the closed position with increasing current. Thus, the current applied to the solenoid valve D controls the exhaust opening for chamber 172 so that as the solenoid valve closes pressure develops in chamber 172 to cause the valve spool to move downward against the spring 176 thereby tending to disconnect exhaust passage 178 from passage 180 while tending to connect passage 182 to passage 180. If pressure is available in passage 182 it will be delivered to brake 58 in an amount generally proportional to solenoid current and will also react on the differential area between lands 164 and 168. The pressure acting on the differential area between lands 164 and 168 assist the spring 176 to cause the valve spool 162 to be positioned in a steady state condition. As the solenoid valve force continues to increase the pressure acting on the differential area will also increase thereby controlling the engagement pressure of brake 58 proportional to the solenoid current. When the solenoid valve D is fully closed, the pressure acting on the differential area and the spring force are not sufficient to overcome the pressure force on land 164 so that the valve 104 will be held downward against the spring 176 in the fully shifted position.

The first relay valve 134 includes a valve spool 184 having equal diameter spaced lands 186 and 188 slidably disposed in a valve bore 190, a pair of plug valves 192 and 194 also slidably disposed in valve bore 190 and a compression spring 196 compressed between valve land 186 and one end of valve bore 190. The valve bore 190 is connected to the engagement passage 126, the exhaust passage 178, the first ratio feed passage 182, the fourth ratio engage passage 160, a second ratio engage passage 198 and a third ratio engage passage 200. In the spring set or first ratio position the passage 126 is in fluid communication between lands 186 and 188 with first ratio feed passage 182 and the exhaust passage 178 is closed by land 186. When the transmission is operating in the second ratio, pressure in passage 198 will move the plug valves 194, 192 and valve spool 184 downward against spring 196 thereby connecting first ratio feed passage 182 to exhaust passage 188 and also causing valve land 188 to block passage 126. When the transmission is operating in the third ratio, pressure in passage 200 will move plug valve 192 and valve spool 184 downward against spring 196 again exhausting first ratio feed passage 182. When the transmission is operating in fourth ratio, pressure in passage 160 will move the valve spool 184 downward against the spring 196 again exhausting first ratio feed passage 182.

The second ratio shift valve 106 is identical in construction with the first ratio shift valve 104 and the corresponding components have been given the same numerical designation with an *a* suffix. The valve bore 166*a* is in fluid communication with the exhaust passage 178 and the second ratio engagement passage 198. The bore 170*a* is in fluid communication with a second ratio feed passage 202. The second ratio shift valve 106 operates in the same manner as the first ratio shift valve 104 such that as the current supplied to solenoid E is increased during an upshift from first ratio or a downshift from third ratio, the fluid pressure to the second ratio brake 56 is controlled by the current supplied to the solenoid E and the fluid pressure acting on the differential area between lands 164a and 168a. Main pressure is supplied to the second ratio shift valve 106 by the second ratio relay valve 136. The second ratio relay valve is identical in construction to the first ratio relay valve 134 and the corresponding components have been given the same numerical designation with an *a* suffix. The second ratio relay valve is controlled or moved toward its shifted position to prevent engagement of the second ratio brake 56 whenever first, third or fourth drive ratios are engaged by fluid pressure in passage 180, 200 and 160 respectively. As an upshift is made from first to second, the pressure in passage 180 will hold the second ratio relay valve 136 in the shifted position thereby connecting second ratio feed passage 202 to the exhaust passage 178. However, as a 1-2 upshift is made, the current to solenoid D is gradually discontinued in a controlled manner thereby permitting the first ratio shift valve 104 to move to the spring set or downshifted position thereby exhausting passage 180 which will permit the second ratio relay valve 136 to move the spring set or unshifted position to connect passage 126 with second ratio feed passage 202. Also during the 1-2 upshift the current to solenoid valve E will increase in a controlled manner thereby gradually closing the solenoid valve so that the second ratio shift valve 106 will move toward the upshifted position to permit engagement of the second ratio brake 56. As described above, for the first ratio brake 58, the engagement pressure to the second ratio brake 56 is controlled by the current to solenoid E and the pressure bias on the differential area between lands 164a and 168a.

The third ratio shift valve 108 is identical in construction with the first and second ratio shift valves and corresponding components have been given the same numerical designation with a *b* suffix. A second ratio feed passage 204 is connected between the third ratio shift valve 108 and the third ratio relay valve 138. The third ratio shift valve 108 functions in a manner identical to that described above for the first and second ratio shift valves to control the engagement of the third brake 52 in proportion to the current supplied to solenoid valve F and the pressure bias acting on the differential area between lands 164b and 168b.

The supply of main pressure to the third ratio shift valve 108 via passage 204 is controlled by the third ratio relay valve 138 which is identical in construction to the first and second relay valves 134 and 136, previously described, and the corresponding components thereof have been given the same numerical designation with a *b* suffix. The third ratio relay valve 138 is moved to its shifted position whenever fluid pressure is present in passage 160, 198 or 180.

The fourth ratio relay valve 140 is identical in construction to the first, second and third relay valves and the corresponding components have been given the same numerical designation with a *c* suffix. The fourth ratio relay valve 140 controls main line pressure through the fourth ratio shift valve 110 via passage 206.

The fourth ratio shift valve 110 includes a valve spool 208 having a large diameter land 210 slidably disposed in valve bore 212 and a small diameter land 214 slidably disposed in valve bore 216. A compression spring 218 is compressed between valve land 210 and one end of valve bore 212 to move the valve spool 208 upward to the position shown. A control chamber 220 is located between one end of valve bore 216 and the end of valve land 214. The pressure in chamber 220 is controlled by a variable force solenoid valve G. As is readily seen, this shift valve will operate in a manner opposite to that described above for the first through third ratio shift valves. As current is increased to the solenoid valve G, the solenoid valve will be moved toward the closed position thereby permitting a pressure buildup in chamber 220 which pressure will act on valve land 214 to move the valve spool 208 downward tending to exhaust a fourth ratio engage passage 160. In the spring set position shown, the valve is set to engage the fourth ratio whenever fluid pressure is available in the fourth ratio feed passage 206. To prevent the fourth ratio from engaging during a neutral-1, 1-2 or 2-3 shift, a current is applied to solenoid G so that the fourth ratio shift valve 110 will move to the shifted position thereby preventing engagement of the fourth ratio clutch 48. However, during operation in the forward drives, if solenoid valves D, E, F and G should fail to function, the transmission will be conditioned for a fourth ratio drive so that continued vehicle operation will occur. This provides a failsafe feature so that in the event that ratio change is not available, the vehicle can still be driven.

The relay valves 134, 136, 138 and 140 are designed so that pressure sufficient to engage the brakes or clutches must be present in the ratio engage passages before the relay valves will shift against the force of their respective bias springs. For example, when the transmission is operating in the first forward drive ratio with the brake 58 engaged, the pressure in passage 180, being sufficient to maintain the brake 58 engaged, will hold the second, third and fourth relay valves in their shifted position. During an upshift from first to second ratio, the pressure in passage 180 will begin to decrease. At one point during this pressure decrease the pressure in passage 180 will no longer be sufficient to hold the second, third and fourth relay valves in their shifted position. When this point is reached, the relay valves will move to their spring set position permitting pressure in passage 126 to be directed to passage 202 through the second relay valve 136. As described above, the second ratio shift valve 106 will control the rise of pressure in the second ratio engage passage 198. As the pressure increases in passage 198 to a valve sufficient to overcome the spring forces of the first, third and fourth relay valves, which pressure will maintain the brake 56 engaged, the relay valves 134, 138 and 140 will be shifted against the force of their respective springs. When the first, third and fourth relay valves are shifted, pressure supplied to the first, third and fourth shift valves will be discontinued. Thus, during a 1-2 upshift, pressure is supplied to both the first ratio brake 58 and the second ratio brake 56 so that an interruption in power flow, from the input shaft to the output shaft, does not occur during an upshift. This same sequence occurs during upshifts between the other drive ratios and also during downshifts between drive ratios.

A check valve generally designated 222 is provided in the exhaust passage 178 so that fluid pressure in exhaust passage 178 will be maintained at a minimum value. This setting is usually between a 0.5 and 0.75 psi.

Referring to FIG. 3, there is shown the electrical control apparatus for operating the solenoid valves A – G to establish the desired gear ratios and to effect smooth shifting from one ratio to another. The control has been specifically designed for and has been used with an engine 4 of the gas turbine type, but is in principle applicable to other types of engines as well. Similarly, the control is not limited to the transmission described herein, but rather is useful, with perhaps minor modifications, in connection with any type of transmission having torque transmitting devices, i.e., clutches or brakes, having variable torque capacities and is especially suitable where shifting is accomplished by engaging one device and disengaging another.

A shift point control 230 selects the range of operation, i.e., reverse, neutral or forward, as well as the desired forward ratio, i.e., first, second, third or fourth ratio. The shift point control may be suitably designed manually controlled electrical switching mechanism or, if desired, may be an automatic control such as that described in the U.S. Pat. to Nelson No. 3,448,640, which is incorporated herein by reference. According to FIG. 3A of that patent in particular, there is shown an apparatus for establishing electrical signals for the desired ranges and ratios. When the shift point control is used with a gas turbine engine, the gasifier speed is used as the engine operating parameter instead of throttle position. The shift point control 230 produces a DC output signal on line 232 to indicate a desired reverse range. That line is connected to an output driver 234 which in turn is connected to solenoid C to energize that solenoid when the line 232 is energized. Forward enable line 236 is energized to indicate a desired forward range. Diodes 238 connect the lines 232 and 236 to a range line 240 which energizes solenoid B through an output driver 242 and energizes the first and reverse solenoid D in the absence of a demand for another drive ratio. An inverter 244 is connected between the range line 240 and an output driver 246 to energize neutral solenoid A only when the line 240 is not energized. The forward enable line 236 is constantly energized while the transmission is in a forward drive range. Second, third or fourth gear ratios are requested by energizing lines 248, 250 and 252 respectively. Thus, when the transmission is operating in the second ratio, for example, the lines 236 and 248 are energized. To call for an upshift to the third ratio, the line 250 is also energized. On the other hand, to call for a downshift from the second to first ratio, the line 248 will be deenergized. The remainder of the circuitry depicted in FIG. 3 is for the purpose of the modulating current to the solenoids D – G in order to effect a smooth shift from one ratio to another when a shift is requested.

A tachometer 254 senses the speed of the driving member or input shaft 10 and is preferably an electromagnetic transducer of the well-known toothed wheel variable reluctance type which produces pulses having a frequency proportional to shaft speed, which pulses are fed to a frequency-to-voltage converter 256 to produce on line 257 a DC voltage proportional to shaft speed. The speed voltage is operated upon by differentiator 258 to produce on line 260 a signal proportional to acceleration of the input shaft 10. The term "acceleration" as used herein denotes either positive acceleration or deceleration unless otherwise specified. A modulation computer 262 has as inputs the acceleration signal on line 260, the speed signal on line 257 and upshift and downshift signals carried by lines 264, 266 respectively. On the basis of those input signals, the modulation computer produces as outputs on lines 268, 270, 272 and 274 modulation signals for the control of selected ones of the solenoids D – G. The solenoids to be energized are selected by a gate circuit 276 which is controlled through a diode matrix 278 by a first and reverse timing and logic circuit 280 and second, third and fourth timing and logic circuits 282, 284 and 286 respectively. The first and reverse timing and logic circuit 280 is energized by the range line 240 which initially produces an upshift signal on line U1 which is fed to the gate 276 and through a diode 288 to the upshift line 264. The upshift signal on line U1 conditions the modulation computer to produce output signals suitable for an upshift and conditions the gate 276 to select the appropriate solenoids for modulating engagement and disengagement. More specifically, with respect to a shift from neutral to first, it is desired to energize the solenoid D to engage the first ratio brake 58 in modulating manner. Accordingly, the gate 276 connects the output driver 290 to the line 268 which carries the oncoming modulation signal. After the first ratio brake has had ample time to become fully engaged, say, two seconds, the timing and logic circuit 280 removes the signal on line U1 and energizes line 292 which fully energizes the solenoid D in the event it has not already been fully energized to force full application of the first ratio brake 58. During a shift from first to second ratio, the line 248 becomes energized to activate the second timing and logic circuit 282 which produces a signal on line U2 which is fed to the gate 276 and is fed through a diode 294 to the upshift line 264. In this case, the gate 276 connects the output driver 296 to the oncoming modulation signal on line 268 to energize the solenoid E to engage the second ratio brake 56 in a modulating fashion and simultaneously the gate 276 connects the output driver 290 to the line 270 carrying the offgoing modulation signal to deenergize the solenoid D in a modulation fashion. At the end of approximately 2 seconds shift time, a line 297 is energized to force full energization of solenoid E and complete deenergization of solenoid D. In the event of a downshift from second to first ratio, the signal is removed from line 248 and the line D2 is energized to appropriately condition the gate 276 and to energize the downshift line 266 via a diode 298. The remaining timing and logic circuits 284 and 286 are connected in a similar manner so that upshift signals are produced on lines U3 and U4 respectively and downshift signals are produced on lines D3 and D4 respectively. The upshift signals on lines U3 and U4 are each connected to energize the upshift line 264 and similarly the downshift signals each energize the downshift line 266. Moreover, for every shift (except first to neutral and third to fourth ratios) a timer 300 is energized through a line 302 connected by diodes 304 to the several lines U1, U2, D2, etc., as shown. The timer in turn conditions the gate 276 to fully energize the solenoid G to maintain the clutch 48 released throughout the shift duration, and for an additional 0.5 seconds after shift completion. In addition, line 306 connects the output of the neutral output driver 246 to the gate 276 to fully energize solenoid G to maintain the clutch 48 released when neutral range is requested. The solenoids D, E and F when energized are modulated according to the signals on lines 268 and 270. However, since the valve associated with solenoid G is opposite in operation to the other ratio valves, in the sense that maximum current of solenoid G corresponds to minimum clutch pressure, a different modulation signal is required for solenoid G and accordingly, when it is energized in a modulating manner, it is controlled by signals on the lines 272 and 274 for upshift and downshift respectively.

Obviously, many modifications and variations are possible in light of the above disclosure. It is, therefore, to be understood that within the scope of the appended claims, the invention may be practiced otherwise than as specifically described.

What is claimed is:

1. A control for a multi-ratio power transmission having friction devices for establishing two drive ratios, said control comprising a fluid pressure source; a pair of shift valve means each having a spool valve with a differential area portion, bias means and a control chamber adjacent said spool valve, each of said spool valves being movable to a downshift position and an upshift position; a pair of relay valve means; first passage means for providing fluid communication between said relay valve means and said source; second passage means for providing individual fluid communication between said relay valve means and said spool valves; third passage means for providing fluid communication between said control chambers and said source; fourth fluid passage means for providing fluid communication between one of said spool valve and one of said friction devices; fifth passage means for providing fluid communication between said other spool valve and the other friction device; and variable force solenoid means for controlling the pressure individually in each of said control chambers; said solenoid means being operable to provide an increase in pressure in one of said control chambers to move said one spool valve from said downshift position toward said upshift position to establish fluid communication between said first passage means, said fourth passage means and said differential area portion; said differential area portion and said biasing means opposing the pressure in said control chamber to regulate the pressure in said fourth passage means, one of said relay valve means being operable to prevent fluid communication between said source and said other spool valve when said one spool valve is upshifted.

2. A control for a multi-ratio power transmission having friction devices for establishing two drive ratios, said control comprising a fluid pressure source; first and second shift valve means each having a spool valve with a differential area portion, bias means and a shift control chamber adjacent said spool valve, each of said spool valves being movable to a disengagement position and an engagement position; first and second relay valve means each having control chamber means; first passage means for providing fluid communication between said relay valve means and said source; second passage means for providing individual fluid communication between said first relay valve means and said first spool valves and between said second relay valve means and said second spool valve; third passage means for providing fluid communication between said control chambers and said source; fourth fluid passage means for providing fluid communication between said first spool valve and one of said friction devices and being connected with the control chamber of said second relay valve means; fifth passage means for providing fluid communication between said second spool valve and the other friction device and being connected with the control chamber of said first relay valve means; and variable force solenoid means for controlling the pressure individually in each of said shift control chambers; said solenoid means being operable to provide an increase in pressure in the first shift valve means shift control chamber to move said first spool valve from said disengagement position toward said engagement position to establish fluid communication between said first passage means, said fourth passage means and said differential area portion; said differential area portion and said biasing means opposing the pressure in said shift control chamber to regulate the pressure in said fourth passage means and supplying pressure to the control chamber of said second relay valve means, said second relay valve means being movable by the pressure in the control chamber to prevent fluid communication between said source and said second spool valve when said first spool valve is in said engagement position.

3. A control for a multi-ratio power transmission having friction devices for establishing two drive ratios, said control comprising a fluid pressure source; first and second shift valve means each having a spool valve with a differential area portion, bias means and a shift control chamber adjacent said spool valve, each of said spool valves being movable to a disengagement position and an engagement position; first and second relay valve means each having control chamber means; first passage means for providing fluid communication between said relay valve means and said source; second passage means for providing individual fluid communication between said first relay valve means and said first spool valves and between said second relay valve means and said second spool valve; third passage means for providing fluid communication between said control chambers and said source; fourth fluid passage means for providing fluid communication between said first spool valve and one of said friction devices and being connected with the control chamber of said second relay valve means; fifth passage means for providing fluid communication between said second spool valve and the other friction device and being connected with the control chamber of said first relay valve means; and variable force solenoid means for controlling the pressure individually in each of said shift control chambers; said solenoid means being operable to provide an increase in pressure in the first shift valve means shift control chamber to move said first spool valve from said disengagement position toward said engagement position to establish fluid communication between said first passage means, said fourth passage means and said differential area portion; said differential area portion and said biasing means opposing the pressure in said shift control chamber to regulate the pressure in said fourth passage means and supplying pressure to the control chamber of said second relay valve means, said second relay valve means being movable by the pressure in the control chamber to prevent fluid communication between said source and said second spool valve when said first spool valve is in said engagement position; said solenoid means being operable to provide an increase in pressure in the second shift valve means shift control chamber to move said second spool valve from said disengagement position toward said engagement position to establish fluid communication between said second passage means, said fourth passage means and said differential area portion; said differential area portion and said biasing means opposing the pressure in said shift control chamber to regulate the pressure in said fourth passage means and supplying pressure to the control chamber of said first relay valve means, said first relay valve means being movable by the pressure in the control chamber to prevent fluid communication between said source and said first spool valve when said second spool valve is in said engagement position.

* * * * *